UNITED STATES PATENT OFFICE 2,586,306

SYNTHESIS OF VITAMIN A AND INTERMEDIATES THEREFOR

John William Copenhaver, Short Hills, N. J., assignor to General Aniline & Film Corporation, New York, N. Y., a corporation of Delaware No Drawing. Application October 26, 1949, Serial No. 123,788

19 Claims. (Cl. 260—611)

This invention relates to an improved process for the synthesis of vitamin A.

In my copending application Serial No. 123,787, filed October 26, 1949, of even date herewith, I have disclosed a process for the synthesis of vitamin A from beta-ionone and vinyl and isopropenyl ethers, wherein no increase occurs in the unsaturation of the successive intermediates produced until the carbon skeleton of vitamin A is completed. This results in a reduction in losses due to side reactions such as oxidation or polymerization, as compared with previously known processes for the synthesis of vitamin A, and facilitates the technique involved in carrying out the reactions and recovery of the products.

According to this invention, a further improvement is made in the stability of the successive intermediates formed in the synthesis of vitamin A from beta-ionone and vinyl and isopropenyl ethers, in that the unsaturation of beta-ionone employed as the starting material is initially reduced, and the resulting intermediate is then subjected to reactions analogous to those involved in the process of my copending application, whereby a new series of intermediates which have a lower degree of unsaturation than those of my copending application is produced. In this way, the yields are still further improved, and handling and processing of the intermediate compounds is still further facilitated.

It is accordingly an object of this invention to provide a process for synthesizing vitamin A from beta-ionone, wherein the unsaturation of the successive intermediate products is and remains less than that of beta-ionone until after the carbon skeleton of vitamin A has been synthesized.

It is a further object of the invention to provide novel intermediate compounds formed in the synthesis of vitamin A in accordance with the invention, and to provide processes for preparing these compounds one from the other.

In accordance with my invention, beta-ionone, employed as the starting material, is condensed with an alcohol or a mercaptan, whereby the acyclic double bond (and in some cases, also the cyclic double bond) of the beta-ionone is saturated by addition of the alcohol or mercaptan, resulting in the introduction of one (and possibly two) ether or thioether groups into the molecule.

The resulting addition product is then converted to the corresponding ketal by reaction with an ortho-carboxylic acid ester, the ketal condensed successively with a vinyl ether, an isopropenyl ether and a vinyl ether, to form a series of ether acetals of which the last one possesses the carbon skeleton of vitamin A. The final condensation product is then subjected to hydrolysis and a dealcoholizing treatment whereby the ether and thioether groups are removed with formation of double bonds, yielding a pentaolefinic aldehyde corresponding to the pentaolefinic alcohol, vitamin A. The aldehyde is reduced, e. g. by reaction with an aluminum secondary alcoholate, to vitamin A.

The reactions occuring in the process of my invention can be formulated as follows:

1. Addition of an alcohol or mercaptan to beta-ionone:

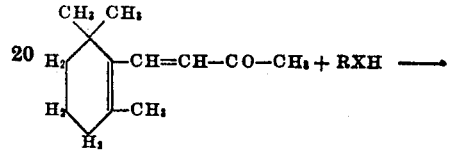

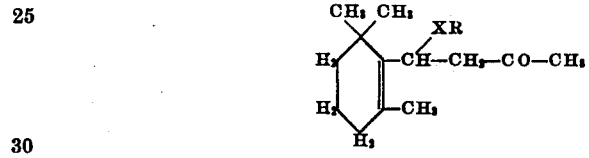

(X representing oxygen or sulfur, and R representing the hydrocarbon radical of the alcohol or mercaptan.)

When 2 mols of RXH instead of 1 mol react with beta-ionone, the resulting product has the formula:

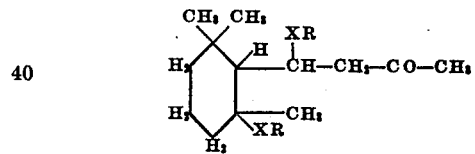

The following equations illustrate only the reactions of the first product formulated above, which contains one double bond in the ring. The fully saturated addition product, formulated above, undergoes an analogous series of reactions in which the saturated cyclic radical replaces the cyclo-olefinic radical in the equations for steps 2, 3(a), 3(b), and 3(c).

2. Reaction of the beta-ionone-alcohol or

-mercaptan addition product with an ortho-carboxylic acid ester to form a ketal:

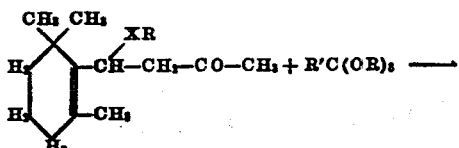

(R' being hydrogen or a hydrocarbon radical of a carboxy acid, the OR of the ortho-carboxylic acid ester representing an alcohol residue, and XR having the same significance as above.)

3. Condensation of the resulting ketal successively with 1 mol of a vinyl ether, 1 mol of an isopropenyl ether and 1 mol of a vinyl ether, to form a series of polyether acetals:

(a)

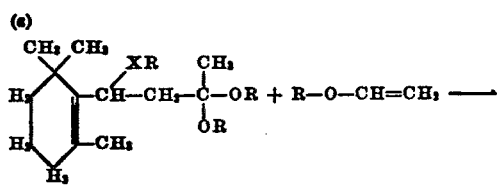

(b)

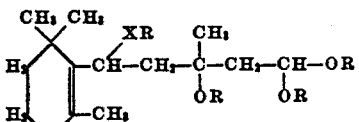

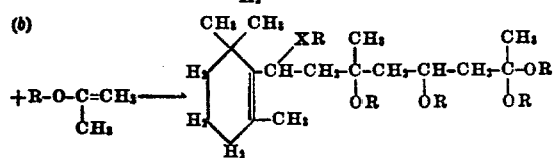

(c)

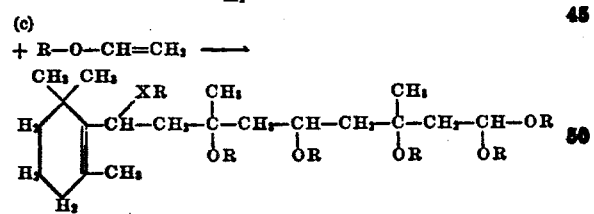

4. Hydrolysis of the acetal radical and removal of the ether radicals from the condensation product of step 3(c) to form a pentaolefinic aldehyde corresponding to the pentaolefinic alcohol, vitamin A:

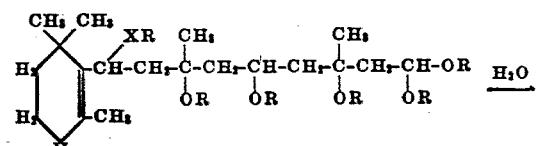

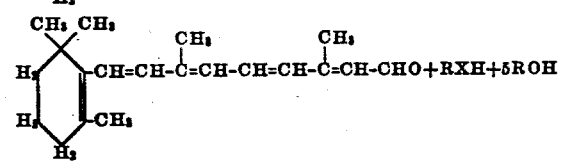

When the polyether acetal is derived from the addition product of beta-ionone with 2 mols rather than 1 mol of RXH, an additional molecule of RXH is eliminated to re-form the double bond in the ring of the pentaolefinic aldehyde, according to the following equation:

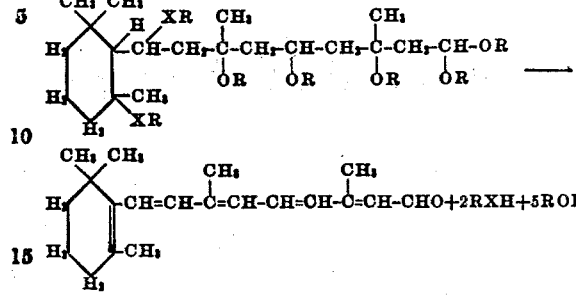

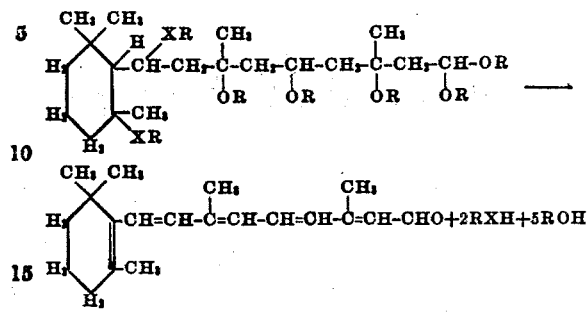

5. The pentaolefinic aldehyde, obtained as indicated in step 4 above, is reduced to the corresponding alcohol, i. e., vitamin A:

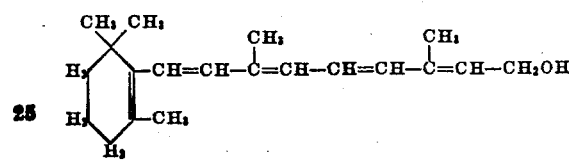

The following series of examples illustrate a perferred method which may be employed for carrying out the process of my invention, parts being by weight unless otherwise indicated, the numbers of Examples 1–5 corresponding to the steps formulated above.

Example 1

19.2 parts (0.1 mol) of beta-ionone are dissolved in three times their volume of anhydrous diethyl ether, and 8 parts (0.25 mol) of anhydrous methanol containing 0.15 part of sodium methylate ($NaOCH_3$), is added thereto. After agitating at room temperature for about 1 hour, the reaction mixture is neutralized with dilute aqueous sulfuric acid, the ether layer separated from the aqueous layer, dried over anhydrous sodium sulfate, and the ether evaporated from the solution. A residue remains containing as its principal component an ether ketone having the formula:

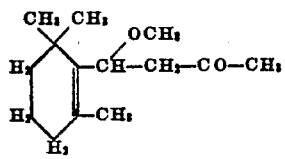

This compound can be purified by fractional distillation under reduced pressure.

By substituting an equivalent amount (11.5 parts) of anhydrous ethanol containing 0.15 part of sodium ethylate for the methanol solution of sodium methylate, the corresponding ethyl ether can be prepared, which undergoes the reactions set out in Examples 2–5 in the same manner as the methyl ether of this example, employing the molecular proportions specified in the following examples.

Example 2

22.4 parts (0.1 mol) of ether ketone prepared according to Example 1 are added to 21.2 parts of methyl ortho-formate containing 0.05 part of the diethyl ether complex of boron trifluoride ($BF_3$ etherate) at a temperature of 25–45° C. The reaction mixture is allowed to stand for 2–3 hours while maintaining the temperature within the aforesaid range. The reaction mixture is dissolved in ether, and the BF₃ catalyst neutralized with a small amount of sodium ethylate or ethanolamine. The ether solution is washed with water, separated from the aqueous layer and dried over anhydrous sodium sulfate. The ether is evaporated, and the dimethyl ketal of the beta-ionone-methanol condensation product is recovered by distillation under reduced pressure from the residual oil.

Example 3(a)

27 parts (0.1 mol of the ether ketal obtained according to Example 2) are mixed with 0.075 part (0.0005 mol) of BF₃ etherate. The mixture is heated to 45° C., and 2 parts (0.035 mol) of methyl vinyl ether are gradually introduced over a period of 15 minutes. The reaction mixture is then stirred at 45-50° C. for 2 hours, cooled and the catalyst neutralized by addition of a small amount of sodium methylate. The neutralized mixture is distilled under reduced pressure to remove the excess of the ether ketal initially employed, and the condensation product having the following formula:

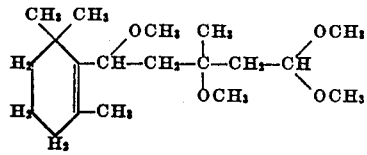

is distilled at highly reduced pressure, particularly by so-called "molecular" distillation.

Example 3(b)

32.8 parts (0.1 mol) of the reaction product of Example 3(a) are mixed with 0.075 part (0.0005 mol) of BF₃ etherate, and 2.4 parts (0.33 mol) of methyl isopropenyl ether are gradually added to the mixture over a period of 15 minutes. The reaction mixture is stirred at a temperature of 45-50° C. for 2 hours, cooled, and the catalyst neutralized as in Example 3(a).

The reaction mixture is worked up in the same manner as in Example 3(a), whereby a condensation product is recovered having the following formula:

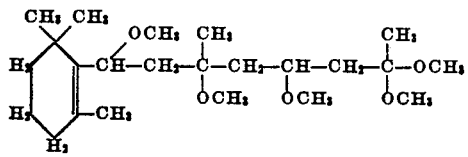

Example 3(c)

40 parts (0.1 mol) of the reaction product of Example 3(b) are treated with 2 parts (0.035 mol) of methyl vinyl ether in the presence of 0.075 part (0.0005 mol) of BF₃ etherate, and the resulting condensation product is recovered in the same manner as in Examples 3(a) and 3(b). The condensation product thus obtained has the following formula:

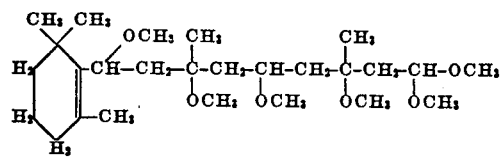

Example 4

45.8 parts (0.1 mol) of the condensation product of Example 3(c) are mixed with 3.6 parts (0.2 mol) of water containing 0.05 part of p-toluene sulfonic acid. The mixture is heated in a distillation apparatus provided with fractionating column, in an inert atmosphere such as nitrogen, to 50° C., and vigorously agitated at this temperature for ½ hour. The temperature is then gradually raised to 65° C. until distillation of methanol virtually ceases. The residue is then taken up in ether, the ethereal solution washed with dilute aqueous sodium carbonate, then with water, and then dried over anhydrous sodium sulfate. These operations are preferably carried out in an atmosphere of nitrogen or other inert gas. The ether is then evaporated from the solution in a nitrogen atmosphere, leaving as a residue a penta-unsaturated aldehyde having the following formula:

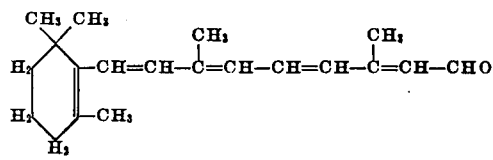

Example 5

The aldehyde obtained according to Example 4 (about 30 parts) is dissolved in 300 parts absolute isopropyl alcohol, and heated to boiling in an atmosphere of nitrogen in a reflux apparatus. 15 parts of aluminum isopropylate are added and isopropyl alcohol is gradually distilled from the mixture while replacing it with fresh isopropyl alcohol in the course of the distillation. The distillation is continued until the isopropyl alcohol distillate fails to yield a positive test for acetone by formation of the crystalline phenyl hydrazone upon treatment with p-nitrophenyl hydrazine in glacial acetic acid. The reaction mixture is then diluted with petroleum ether (B. P. 30-40° C.) and extracted with 5% aqueous phosphorous acid. The aqueous extract is extracted with additional petroleum ether and the combined petroleum ether extracts are dried over anhydrous sodium sulfate, yielding a solution of vitamin A. The product can be recovered from the solution by chromatographic adsorption on aluminum oxide from the petroleum ether solution, and elutriated from the adsorbent with a mixture of benzene and petroleum ether. A pure product can be obtained in this manner, having properties similar to vitamin A obtained from natural substances.

In order to prepare a mercaptan addition product of beta-ionone, the following procedure can be employed:

Example 6

19.2 parts (0.1 mol) of beta-ionone are mixed with 10.4 parts (0.1 mol) of isoamyl mercaptan. To the resulting mixture there is added 0.5 part of piperidine as a catalyst. A similar amount of sodium ethylate or diethylamine can be used instead of piperidine. The reaction mixture is allowed to stand for several hours, and then dissolved in hot alcohol from which the reaction product can be recovered by crystallization. The reaction product has the formula:

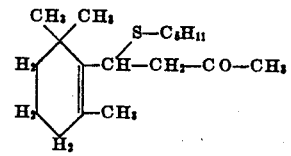

Similar compounds can be prepared by employing other mercaptans instead of isoamyl mercaptan, e. g. methyl mercaptan or ethyl mercaptan. The resulting mercaptan addition products of beta-ionone can be processed in the same manner disclosed above in Examples 2, 3(a), 3(b), 3(c), 4 and 5 to obtain vitamin A, the successive intermediates produced corresponding to those of Examples 2, 3(a), 3(b), 3(c), and differing only in that the mercapto ether group replaces the methoxy group attached to the carbon atom of the chain adjacent the cyclohexenyl ring.

In carrying out the successive steps of the process illustrated in the foregoing examples, numerous variations and modifications can be made, if desired.

Thus, in the procedure of Example 1, other alcohols can be employed for addition to beta-ionone, e. g. isopropyl alcohol, butyl alcohol or benzyl alcohol. Similarly, in Example 6, the mercaptans corresponding to the aforesaid alcohols can be used.

In the addition of the alcohol to beta-ionone, a quantity of anhydrous alcohol is employed which is at least equal to the amount stoichiometrically required and preferably in excess thereof, e. g. 2 to 5 times said amount. To promote the addition, an alkali metal alcholate, preferably of the alcohol to be added, is employed in catalytic amounts of the order of 0.01% to 0.1% by weight of the amount of beta-ionone, the alcoholate being advantageously dissolved in the alcohol to be added. Addition occurs spontaneously without external heating, although the mixture can be heated to temperatures up to 100° C. However, temperatures not exceeding 50° C. are preferable.

In the addition of mercaptans to beta-ionone illustrated in Example 6, equimolecular amounts of beta-ionone and the mercaptan are preferably reacted, although an excess of the mercaptan can be used. An inert diluent can also be added, but since the reaction takes place satisfactorily without such addition, solvents are preferably omitted. The mercaptan addition is catalyzed by alkaline reacting compounds soluble in the mixture of the reagents, especially secondary or tertiary amino compounds such as piperidine or diethylamine, or an alkali metal alcoholate.

In the procedure of Example 2, the ortho-ester employed for conversion of the beta-ionone alcohol or mercaptan addition product to the corresponding ketal, can be an ortho-ester of lower fatty carboxylic acids other than formic acid, e. g. it can be an ortho-acetate, ortho-propionate or ortho-butyrate. Similarly, the ortho-ester may include the radicals of other lower monohydric alcohols instead of methyl alcohol, e. g. ethyl, propyl, butyl or benzyl alcohol. Ortho-esters of lower aliphatic carboxy acids can also be used in which the esterifying alcohols include dihydric alcohols such as 1, 3-propanediol, together with a monohydric alcohol, as found, for example, in 2-ethoxy-1, 3-dioxolane, which is an ortho-ester of formic acid with ethyl alcohol and 1, 3-propanediol.

The proportions of the ortho-ester and the beta-ionone addition product can be varied, but it is convenient to employ a molecular excess of ortho-ester with respect to the ionone addition product, a mol ratio of about 2:1 being particularly suitable, as illustrated in Example 2.

An acid condensation catalyst is employed to promote ketal formation, such catalysts including $BF_3$, $BF_3$ etherate, $BCl_3$, $SnCl_3$, $TiCl_4$ or $H_2SO_4$, or acid salts such as ammonium chloride or ammonium nitrate, a suitable proportion of catalyst being from 0.0001 to 0.01 mol per mol of ortho-ester. The temperature employed in the reaction can be from 0 to 50° C. Higher temperatures within this range accelerate the reaction and in general, provide more satisfactory operating conditions.

The methyl ethers of vinyl and isopropenyl alcohols employed in Examples 3(a), 3(b) and 3(c) can be replaced by other alkyl ethers, such as the corresponding ethyl, propyl, isopropyl, butyl and benzyl ethers of vinyl and isopropenyl alcohol. The condensation reactions of these examples are carried out under anhydrous conditions. While an inert solvent or diluent can be used, it is generally more advantageous to bring the reagents together in the absence of a diluent so as to afford maximum opportunity for rapid combination of the vinyl or isopropenyl ether with the ketal or acetal. To limit undesirable side reactions, especially polymerization of the vinyl or isopropenyl ethers, a substantial excess of the ketal or acetal is preferably maintained in the reaction mixture throughout the condensation. Thus, in general, it is preferred to employ at least 2 and preferably about 3 mols of the acetal or ketal for each mol of vinyl or isopropenyl ether introduced. By reason of the resulting inhibition of polymerization of the vinyl or isopropenyl ethers, a higher ultimate yield can be obtained when the unreacted acetal or ketal, recovered in each case, is recycled to a subsequent condensation.

The condensation reactions of Examples 3(a), 3(b) and 3(c) are promoted by inclusion of acid reacting anhydrous condensing agents as catalysts in the mixture, as, for example, those used in Example 2. The proportion of catalyst employed can be from 0.0001 to 0.1 mol per mol of the acetal or ketal, and is preferably between 0.0025 and 0.01 mol. The temperature of the condensation can vary between 0 and 100° C., but is preferably not higher than 50° C. Vinyl methyl ether (B. P. 5-6° C.) is a gas at room temperature, while the higher molecular weight ethers as well as the isopropenyl ethers are liquid. When the temperature employed is such that the ether is relatively volatile, superatmospheric pressures can be used to avoid excessive volatilization of the ether from the reaction mixture.

In carrying out the dealcoholation treatment and hydrolysis of Example 4, water is added to the polyether acetal in at least an equimolecular amount. The amount of water added in excess is not critical, however, and it is convenient to add 2-3 mol of water per mol of the polyether acetal. A water-soluble acidic substance is employed as the catalyst for the hydrolysis and dealcoholation, preferably an organic non-volatile acid such as p-toluene sulfonic acid. However, other organic acids such as acetic acid can be used, or inorganic acids such as HCl, $H_2SO_4$, $H_3PO_4$, or water-soluble acid reacting salts such as $NH_4Cl$, $ZnCl_2$, $NaHSO_4$, and the like. The amount of acid is small, amounting, for example to 0.001 to 0.1 mol per mol of water. The temperature is advantageously maintained at from 50 to 100° C. In general, the temperature may suitably be maintained at about the boiling point of the alcohol which is eliminated, within the aforesaid range. Since this step involves formation of a poly-unsaturated aldehyde, oxygen is preferably excluded to avoid excessive loss from oxidation or polymerization of the product. Moreover, the polyolefinic aldehyde produced is protected from contact with oxygen until and during its subsequent conversion to vitamin A.

The same procedure is employed for the preparation of the polyolefinic aldehyde regardless whether the poly-ether acetal is derived from the addition product of beta-ionone with a mercaptan or an alcohol, and regardless whether 1 or 2 mols of the alcohol or mercaptan are involved in the initial addition reaction. In either case, the ether or thioether radicals introduced by the addition reaction with beta-ionone are eliminated to re-form the double bonds originally present in beta-ionone.

The final step of the process corresponding to Example 5 above involves reduction of the aldehyde with the aluminum alcoholate of a secondary alcohol, e. g. isopropanol, 2-butanol, or 2- or 3-pentanol. Aluminum isopropylate is particularly well suited since the alcohol as well as the acetone produced therefrom are volatile and water-soluble, and can therefore be readily removed from the reaction product. Reduction of the polyolefinic aldehyde to vitamin A is carried out in alcoholic solution under anhydrous conditions, and the final product can be recovered as indicated in the example by extraction with hydrocarbon solvents, or by molecular distillation.

Other variations and modifications which will be obvious to those skilled in the art can be made in the foregoing process without departing from the scope or spirit of this invention.

I claim:

1. In a process for the synthesis of vitamin A or of an intermediate therefor, the steps which comprise condensing a compound of the group consisting of alcohols and mercaptans with β-ionone, wherein olefinic double bond saturation occurs by addition of said compound at least at the exonuclear olefinic double bond of the β-ionone, reacting the resulting addition product with an ortho-carboxylic acid ester to form a ketal, condensing the resulting ketal successively with 1 molecule of a vinyl ether, 1 molecule of an isopropenyl ether, and 1 molecule of a vinyl ether to form a polyether acetal having the formula:

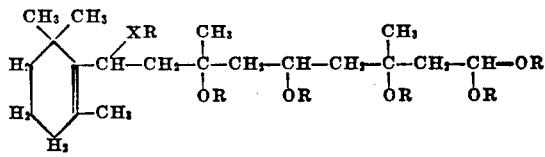

wherein X represents a member of the group consisting of oxygen and sulfur, and the R's represent hydrocarbon groups, and subjecting said polyether acetal to hydrolyzing and dealcoholizing treatment to form a polyolefinic aldehyde corresponding to vitamin A, which yields vitamin A upon reduction with an aluminum alcoholate of a secondary alcohol.

2. In a process for the synthesis of vitamin or of an intermediate therefor, the step which consists in condensing a compound of the group consisting of alcohols and mercaptans with β-ionone in the presence of an alkaline catalyst soluble in the condensation reaction mixture, wherein saturation of an olefinic double bond occurs by addition of said compound at least at the exonuclear olefinic double bond of the β-ionone to form an addition product having the following formula:

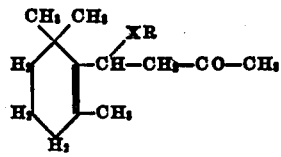

wherein X represents a member of the group consisting of oxygen and sulfur, and R represents a hydrocarbon group.

3. A process as defined in claim 2, wherein the alkaline catalyst is an alkali metal alcoholate and the compound condensed with β-ionone is a lower aliphatic alcohol.

4. A process as defined in claim 2, wherein the alkaline catalyst is an organic nitrogen base having at least 1 hydrogen attached to nitrogen, and the compound condensed with β-ionone is a lower aliphatic mercaptan.

5. In a process for the synthesis of vitamin A or of an intermediate therefor, the step which consists in reacting a compound having the formula:

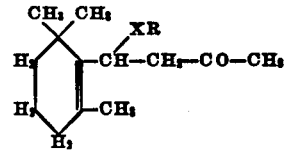

wherein X represents a member of the group consisting of oxygen and sulfur and R represents a hydrocarbon radical, with an ortho-carboxylic acid ester in the presence of an acid condensation catalyst to form the corresponding ketal having the formula:

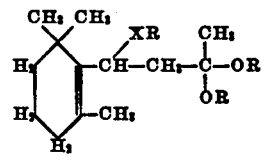

the R's representing hydrocarbon radicals, and X having the significance stated above.

6. A process as defined in claim 5, wherein the ortho-carboxylic acid ester is an ortho-formate of a lower aliphatic alcohol and the catalyst is BF₃ etherate.

7. In a process for the synthesis of vitamin A or of an intermediate therefor, the step which consists in condensing a ketal having the following formula:

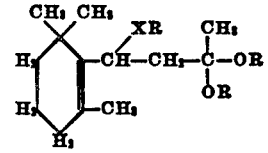

wherein X represents a member of the group consisting of oxygen and sulfur, and the R's represent hydrocarbon radicals, with a vinyl ether in the presence of an acid condensation catalyst to form an ether acetal having the formula:

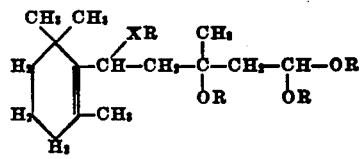

wherein the R's represent hydrocarbon radicals, and X has the significance stated above.

8. A process as defined in claim 7, wherein the vinyl ether is vinyl methyl ether and the condensation is carried out in the presence of BF₃ etherate as the catalyst.

9. In a process for the synthesis of vitamin A or of an intermediate therefor, the step which consists in condensing an ether acetal having the formula:

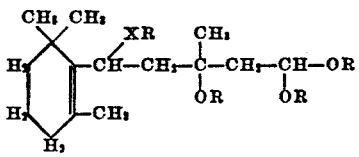

wherein X represents a member of the group consisting of oxygen and sulfur, and the R's represent hydrocarbon radicals, with an isopropenyl ether in the presence of an acid condensation catalyst to form the polyether acetal having the formula:

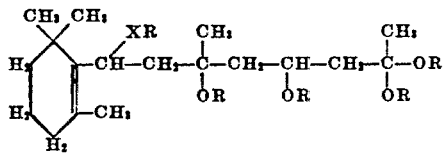

the R's representing hydrocarbon radicals, and X having the significance stated above.

10. A process as defined in claim 9, wherein the isopropenyl ether is isopropenyl methyl ether and the condensation is carried out in the presence of BF₃ etherate as the catalyst.

11. In a process for the synthesis of vitamin A or of an intermediate therefor, the step which consists in condensing a polyether acetal having the formula:

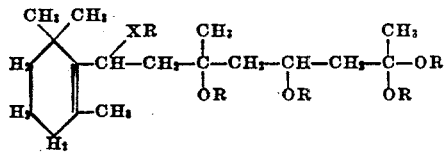

wherein X represents a member of the group consisting of oxygen and sulfur, and the R's represent hydrocarbon radicals, with a vinyl ether in the presence of an acid condensation catalyst to form a polyether acetal having the formula:

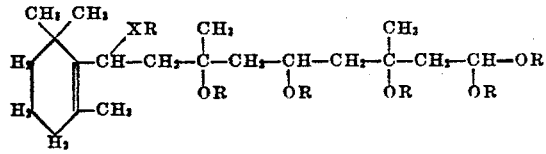

the R's representing hydrocarbon radicals, and X having the significance stated above.

12. A process as defined in claim 11, wherein the vinyl ether is vinyl methyl ether, and the condensation is carried out in the presence of BF₃ etherate as the catalyst.

13. In a process for the synthesis of vitamin A or of an intermediate therefor, the step which consists in heating a polyether acetal having the formula:

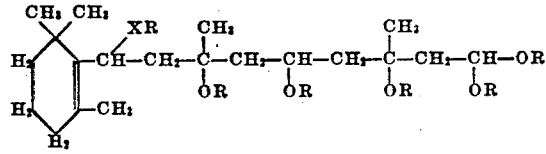

wherein X represents a member of the group consisting of oxygen and sulfur, the R's representing hydrocarbon radicals, with at least an equimolecular amount of water in the presence of a water-soluble acidic substance as the catalyst, at a temperature of 50–100° C. in an inert non-oxidizing atmosphere, whereby the said polyether acetal is converted to a polyolefinic aldehyde having the formula:

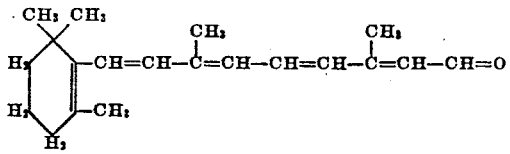

14. A process as defined in claim 13, wherein the acidic substance is para-toluene sulfonic acid, and the R's represent lower alkyl groups in the formula of the polyether acetal.

15. A compound of the general formula:

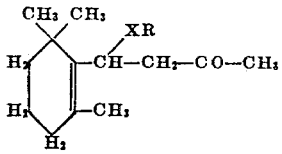

wherein X represents a member of the group consisting of oxygen and sulfur, and R represents the hydrocarbon radical of an alcohol.

16. A compound of the general formula:

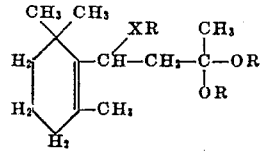

wherein X represents a member of the group consisting of oxygen and sulfur, and R represents the hydrocarbon radical of an alcohol.

17. A compound of the general formula:

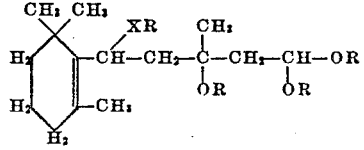

wherein X represents a member of the group consisting of oxygen and sulfur, and R represents the hydrocarbon radical of an alcohol.

18. A compound of the general formula:

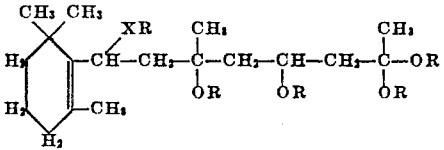

wherein X represents a member of the group consisting of oxygen and sulfur, and R represents the hydrocarbon radical of an alcohol.

19. A compound of the general formula:

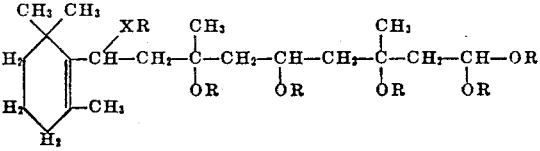

wherein X represents a member of the group consisting of oxygen and sulfur, and R represents the hydrocarbon radical of an alcohol.

JOHN WILLIAM COPENHAVER.

No references cited.